March 11, 1958 W. A. MUELLER 2,826,112

STEREOSCOPIC PICTURE AND STEREOPHONIC SOUND SYSTEMS

Filed May 29, 1953 2 Sheets-Sheet 1

INVENTOR.
William A. Mueller
BY Sol R. Goshaw
ATTORNEY.

STEREOSCOPIC PICTURE AND STEREOPHONIC SOUND SYSTEMS

Filed May 29, 1953 2 Sheets-Sheet 2

INVENTOR.
William A. Mueller
BY
Orl R. Goshorn
ATTORNEY.

United States Patent Office 2,826,112

Patented Mar. 11, 1958

2,826,112

STEREOSCOPIC PICTURE AND STEREOPHONIC SOUND SYSTEMS

William A. Mueller, Los Angeles, Calif., assignor to Warner Bros. Pictures, Inc., Burbank, Calif., a corporation of Delaware Application May 29, 1953, Serial No. 358,343

3 Claims. (Cl. 88—16.2)

This invention relates to directional and stereophonic sound reproduction, particularly for use with stereoscopic projection of motion pictures.

The usual type of stereoscopic picture projection utilizes two prints, one of which projects the picture to be viewed with the left eye, and the other which projects the picture to be viewed by the right eye. The two pictures may be separated by colors or by polarization of the light at the projectors and in viewers worn by the observers. To enhance the pictorial presentation of the picture, depth or stereophonic sound is desirable. This sound may have both directional and binaural characteristics. That is, there may be a speaker located centrally behind the screen, a speaker on the left side of the screen, and a speaker on the right side of the screen. Other speakers may be distributed on the sides and/or in the rear of the auditorium.

The present invention discloses a system which will provide three-dimensional pictures and directional or stereophonic sound effects as well as permit the presentation of two-dimensional pictures in theaters not equipped for the stereoscopic presentation of the picture or the stereophonic presentation of the sound.

The principal object of the invention, therefore, is to facilitate the presentation of a picture story.

Another object of the invention is to provide an improved system of stereoscopic picture and stereophonic sound presentation.

A further object of the invention is to provide a picture projection and sound reproducing system which may present a story in either two dimensions or three dimensions from the picture standpoint and a single reproducing channel or multiple channels from the sound reproducing standpoint.

Although the novel features which are believed to be characteristic of this invention will be pointed out with particularity in the appended claims, the manner of its organization and the mode of its operation will be better understood by referring to the following description, read in conjuction with the accompanying drawings, forming a part hereof, in which:

Figure 1:
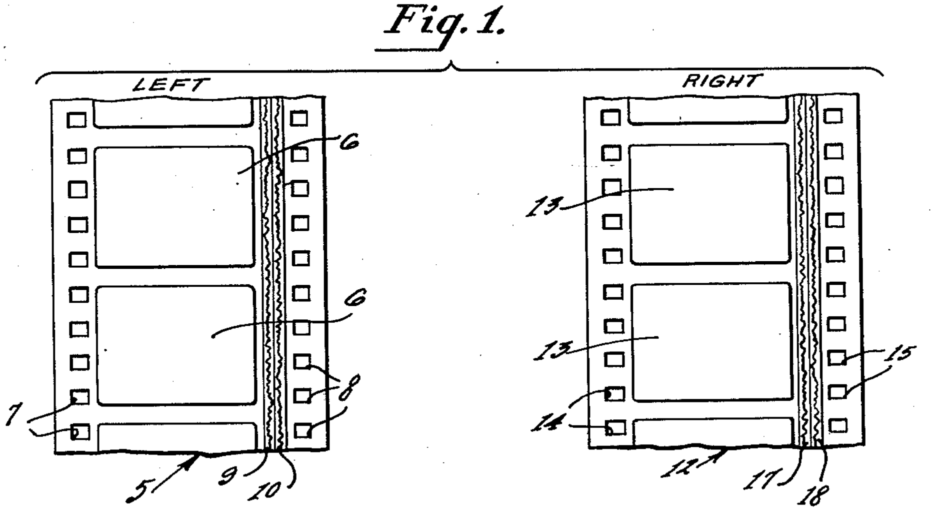
Fig. 1 shows sections of two stereoscopic picture prints having a certain sound track arrangement thereon.

Referring now to Fig. 1, the left print 5 has pictures 6 thereon with perforations or sprocket holes 7 and 8. Positioned between the pictures 6 and the perforations 8, are two separate photographic sound tracks 9 and 10, although it is to be understood that they could be magnetic tracks. The right print 12 has pictures 13 thereon and rows of perforations 14 and 15. Between the pictures 13 and the row of perforations 15, are two separate photographic sound tracks 17 and 18, which could also be magnetic sound tracks.

Figure 2:
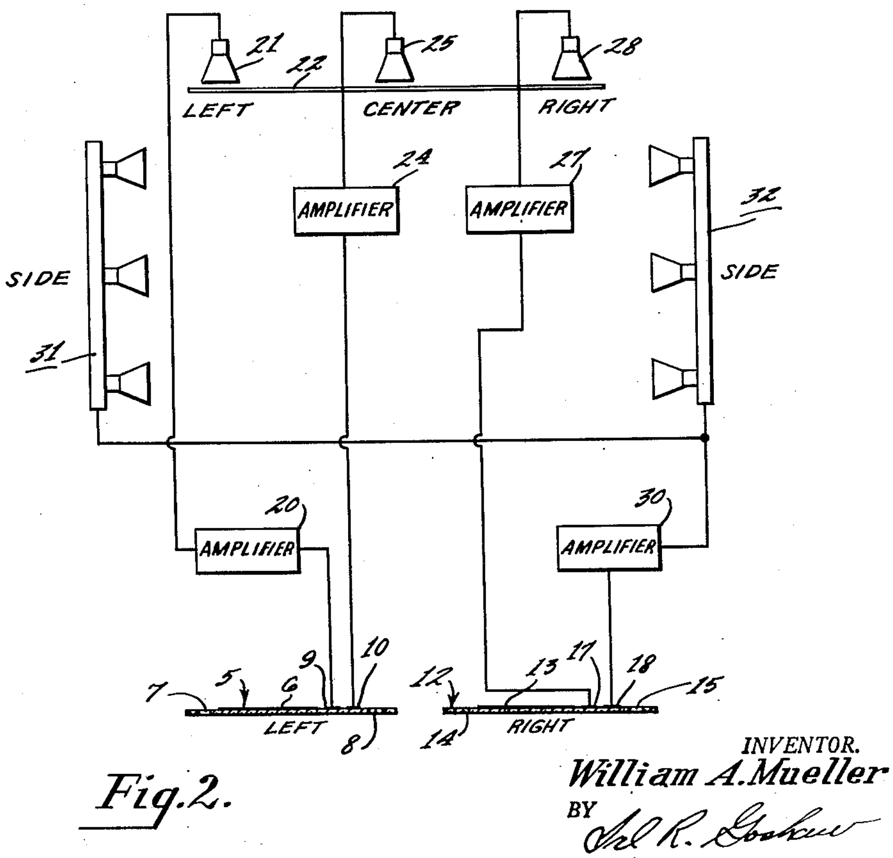
Fig. 2 is a diagrammatic view showing a stereophonic sound reproducing system for the prints of Fig. 1.

Referring now to Fig. 2, the two films 5 and 12 are shown, sound track 9 on print 5 being shown connected through an amplifier 20 to a left-hand speaker 21 behind a screen 22. Sound track 10 is shown connected through an amplifier 24 to a speaker 25 centrally located behind the screen 22. Sound track 17 on print 12 is shown connected through an amplifier 27 to a right-hand speaker 28. The track 18 on film 12 is shown connected over amplifier 30 to a group of speakers 31 on the left-hand side of the auditorium, and a group of speakers 32 on the right-hand side of the auditorium. Speakers in the rear of the auditorium may be connected to track 18 also. The tracks 9, 10, 17, and 18 contain signals appropriate to the position of the sound sources as they are projected on the screen 22, the side speakers being used for the enhancement of sound effects which envelope the observers.

Figure 3:
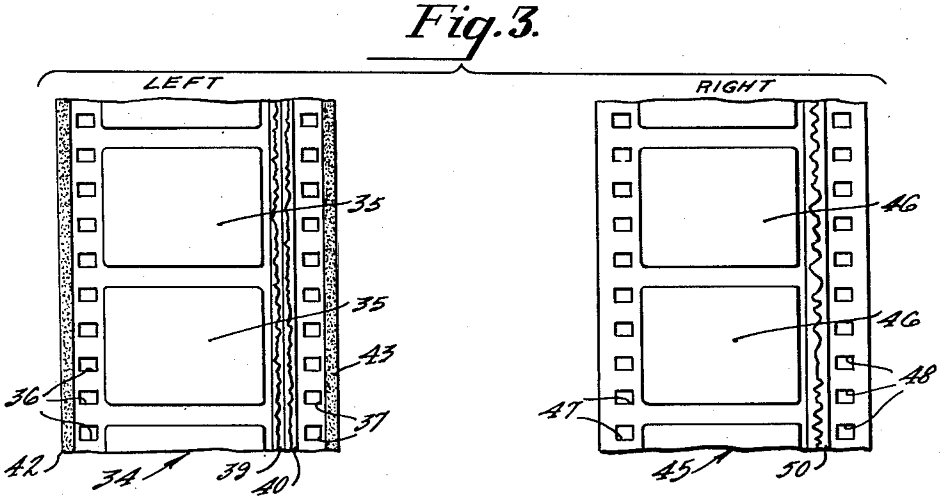
Fig. 3 shows sections of two stereoscopic picture prints having a different arrangement of sound tracks thereon from that shown in Fig. 1.

Referring now to Fig. 3, a left-hand print 34 has pictures 35 thereon and two rows of perforations 36 and 37. Between the pictures 35 and the perforations 37 are two photographic sound tracks 39 and 40. This print, however, also includes two magnetic sound tracks, one track 42 being between the perforations 36 and one edge of the film, and the other magnetic track 43 being between the perforations 37 and the other edge of the film. The right print 45 has pictures 46 and rows of perforations 47 and 48. Between the pictures 46 and perforations 48, is a standard width photographic sound track 50. Thus, the print 45 is of the usual type of thirty-five millimeter motion picture release film having normal pictures 46 and the normal composite track 50, which includes all sounds necessary for the presentation of the picture.

Figure 4:
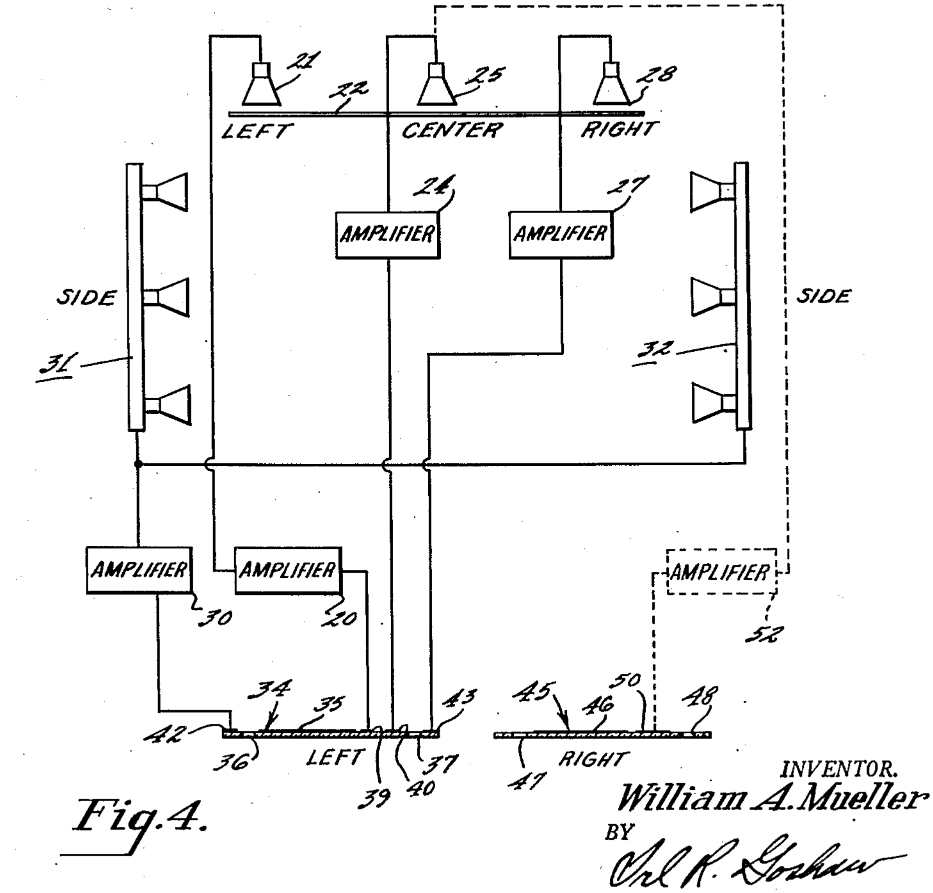
Fig. 4 is a diagrammatic drawing of a stereophonic sound reproducing system including a single channel modification thereof.

Referring now to Fig. 4, the manner of utilizing the prints 34 and 45 is illustrated. In a theater in which a stereophonic sound system is available along with a stereoscopic picture system, the four sound tracks on print 34 are used in the same manner as shown in Fig. 2. That is, sound track 39 is connected over amplifier 20 to left-hand speaker 21, and sound track 40 is connected over amplifier 24 to center speaker 25 behind screen 22. However, the right-hand speaker 28 is now connected to magnetic sound track 43 over amplifier 27, while the side speakers 31 and 32 are connected with magnetic track 42 over amplifier 30. In this instance of stereoscopic picture and stereophonic sound presentation, the composite track 50 is not used. However, in a theater having only a single projector and a single sound reproducing channel, such as shown by the dotted lines 52, only print 45 is used, which then provides a two dimensional picture and a single channel sound system to the central speaker 25, which is available in all theaters.

In the above described systems, stereophonic sound may be presented with stereoscopic pictures, the four sound tracks being photographic or magnetic, two of which are positioned on one print and two of which are positioned on the other print. The other modification provides all four sound tracks on one print to obtain stereophonic sound when desired, and a normal photographic composite sound track on the other print, which is used only in single sound channel theaters. The availability of such a composite photographic track in a stereophonic sound system provides an operable system in the event that the stereophonic sound system fails.

I claim:

1. A combination stereoscopic picture and stereophonic sound reproducing system adaptable for both stereoscopic picture projection and stereophonic sound reproduction and normal two-dimensional picture projection and one-dimensional sound reproduction comprising a pair of stereoscopic picture prints, one of said prints having at least a pair of sound tracks thereon in the normal sound track area, each of said tracks containing a portion of a complete sound signal, and the other of said prints having at least one sound track thereon in the normal sound track area, said one sound track containing said complete sound signal, a picture screen on which the pictures on said prints are projected, a central speaker, means for connecting said speaker to one of said sound tracks for reproducing a certain portion of said complete sound signal, a left-hand speaker, means for connecting said left-hand speaker to another of said sound tracks for reproducing another portion of said complete sound signal, a right-hand speaker, and means for connecting said right-hand speaker to a third sound track for reproducing a third portion of said complete sound signal, said sound reproduction being during the simultaneous projection of said prints.

2. A combination stereoscopic picture and stereophonic sound system adaptable for both stereoscopic picture projection and stereophonic sound reproduction and normal two-dimensional picture projection and one-dimensional sound reproduction comprising a pair of picture prints, one of said prints having a pair of sound tracks in the normal sound track area, and a sound track along each edge of said print, each of said sound tracks providing a portion of a complete sound signal, the other of said prints having a composite sound track in the normal sound track area thereof, said composite sound track containing said complete sound signal, a screen on which the pictures on said prints are projected, a plurality of speakers behind said screen and at the sides of said screen, and means for connecting one of the sound tracks on said first-mentioned print to one speaker, a second of said sound tracks to another speaker, a third sound track to a third speaker, and a fourth sound track to said remaining speakers, the simultaneous reproduction of all of said sound portions of said complete sound signal being during the simultaneous projection of said prints.

3. A combination stereoscopic picture and stereophonic sound system in accordance with claim 2, in which said composite sound track is photographic and said sound tracks along each edge of said one print are magnetic tracks.

References Cited in the file of this patent

UNITED STATES PATENTS

| | | |
|---|---|---|
| Re. 18,090 | Kwartin | June 2, 1931 |
| 1,852,624 | Nicolson | Apr. 5, 1932 |
| 1,944,182 | Jones | Jan. 23, 1934 |
| 2,060,204 | Hammond | Nov. 10, 1936 |
| 2,101,121 | Wixon | Dec. 7, 1937 |
| 2,263,316 | Ryan | Nov. 18, 1941 |
| 2,298,618 | Garity et al. | Oct. 13, 1942 |
| 2,566,700 | Goldsmith | Sept. 4, 1951 |
| 2,585,913 | Camras | Feb. 19, 1952 |
| 2,628,288 | Blaney | Feb. 10, 1953 |

FOREIGN PATENTS

| | | |
|---|---|---|
| 342,284 | Great Britain | Feb. 26, 1931 |